United States Patent
Ytterberg

(10) Patent No.: US 6,938,942 B1
(45) Date of Patent: Sep. 6, 2005

(54) AUXILIARY WINDSHIELD SUN VISOR

(76) Inventor: Donald G. W. Ytterberg, 2356 S. Hiwan Dr., #41, Evergreen, CO (US) 80439

( * ) Notice: Subject to any disclaimer, the term of this patent is extended or adjusted under 35 U.S.C. 154(b) by 0 days.

(21) Appl. No.: 10/798,207

(22) Filed: Mar. 11, 2004

(51) Int. Cl.7 ................................................. B60J 3/00
(52) U.S. Cl. .................. 296/97.9; 296/97.1; 296/97.7; 296/97.8
(58) Field of Search .............................. 296/97.1, 97.7, 296/97.8, 97.9; 160/DIG. 3; 224/312

(56) References Cited

U.S. PATENT DOCUMENTS

| | | | | |
|---|---|---|---|---|
| 4,576,409 A | * | 3/1986 | Ebert | 296/97.1 |
| 4,958,879 A | * | 9/1990 | Gillum | 296/97.6 |
| 5,213,147 A | * | 5/1993 | Zheng | 296/97.7 |
| 5,333,927 A | * | 8/1994 | PreJean | 296/97.7 |
| 5,553,908 A | * | 9/1996 | Shink | 296/97.8 |
| 5,628,357 A | * | 5/1997 | Hwang | 296/97.7 |
| 5,979,967 A | * | 11/1999 | Poulson | 296/97.9 |
| 6,179,038 B1 | * | 1/2001 | Eskandry | 296/97.8 |
| 6,296,294 B1 | * | 10/2001 | Kohnle et al. | 296/97.9 |
| 6,513,855 B2 | * | 2/2003 | Zenisek | 296/97.9 |
| 6,648,396 B2 | * | 11/2003 | Monahan et al. | 296/97.7 |

* cited by examiner

Primary Examiner—D. Glenn Dayoan
Assistant Examiner—Greg Blankenship
(74) Attorney, Agent, or Firm—Scott L. Terrell

(57) ABSTRACT

In a motor vehicle wherein a rear view mirror is attached in a spaced relationship to an interior of a windshield by a support arm disposed intermediately between a pair of spaced sun visors, in combination, a sun visor is provided which includes a panel envelope formed of an elastic material defining a predetermined perimeter of a predetermined expanse having front and back surfaces, a single closed loop of a spring-like material located about the an interior perimeter of the envelope, the loop dimensioned to have an expanse which is greater than the expanse of the envelope so as to stretch the envelope, and wherein a compliant compressive spring force of the loop retains the sun visor between a roofline adjacent to the interior of the windshield and the support arm while the vehicle is in motion.

7 Claims, 2 Drawing Sheets

AUXILIARY WINDSHIELD SUN VISOR

CROSS REFERENCE TO RELATED APPLICATIONS

Not Applicable.

BACKGROUND OF THE INVENTION

1. Field of the Invention

The present invention relates to windshield sun visors. In particular, it relates to removable sun visors for spanning the distance between the ends of conventional vehicle visors.

2. Description of the Related Art

It is well known that one problem with the conventional sun visors in vehicles is that even when both the left and right visors are placed in the downward position there is a space formed between them where the sun is not blocked; especially when the sun is lower on the horizon. This space cannot be blocked by the conventional sun visors since they do not reach that area of the windshield behind the rear view mirror. A solution is to provide an auxiliary sun visor, which is easily secured between the windshield and the rear view mirror to bridge the space between the conventional sun visors.

Up to now few examples of such sun visors exist. One example, U.S. Pat. No. 5,979,967, to Poulson, discloses an auxiliary sun visor in the form of an oblong panel that is placed in front of a rear view mirror to bridge the space between the standard sun visors of a motor vehicle. The panel is held place with hook and loop fastening members adhered to one surface of the panel and on the forward surface of the rear view mirror to attach the panel to the rear view mirror. A problem with this design is that it requires permanently attaching fastening members to the front of the mirror, and is not quickly and easily installed or removed.

Another example, U.S. Pat. No. 5,333,927, to PreJean, discloses a sun shielding device that is a flat and flexible and resilient lightweight plate having a surface which may be placed against the inside of the vehicle's windshield, between the sun visors, to block the sun's rays. The sunshade is thick enough to contain a pocket for holding accessories and is held in place by either wedging it between the windshield and the rear view mirror or using by a separate suction device.

Yet another example, U.S. Pat. No. 5,333,927, to Konishi, discloses an auxiliary visor that is designed for use in case the rear view mirror is installed on a front roof rail, ceiling member, or the like, by means of a stay. The auxiliary visor includes a shield disposed between the sun visors, a mounting shaft fixedly installed on the shield having an exposed portion on the mounting shaft. A mounting bracket is installed on a mounting stay of the rear view mirror and the mounting bracket has a gripping portion in the form of a part-circular cross section for supporting the exposed portion of the mounting shaft.

While the foregoing examples offer some utility, a major disadvantage in each lies in the fact that they are not deformable for selectively filling the gap above and behind a rear view mirror, which is not covered by the existing sun visors, when the vehicle changes in direction. The foregoing examples also do not provide for quick and easy installation and removal, are of a rather complex construction, and in most cases require the installation of mounting members for securing the sun visors either to the mirror or the windshield, which limits their use to that of a single motor vehicle. Thus, it is desirable to provide a deformable auxiliary sun visor for selectively filling a gap above and behind the rear view mirror which is not covered by existing sun visors, but which is universal for use in a number of motor vehicles and is lightweight and simple in construction. The present invention satisfies these needs.

BRIEF SUMMARY OF THE INVENTION

It is therefore an object of the present invention to provide an auxiliary sun visor for selectively filling in the gap above and behind a rear view mirror that is not covered by the conventional sun visors.

It is another object of the present invention to provide an auxiliary sun visor that is simple in construction and universal in use for more than one motor vehicle.

It is another object of the present invention to provide an auxiliary visor that is easily installed or removed while filling the gap above and in front of a rear view mirror for use while the vehicle is in motion.

It is yet another object of the present invention to provide an auxiliary visor which is lightweight and simple in construction.

To overcome the problems of the prior art methods and in accordance with the purpose of the invention, as embodied and broadly described herein, briefly, in a motor vehicle wherein a rear view mirror is attached in spaced relationship to an interior of a windshield by a support arm disposed intermediately between a pair of spaced sun visors, in combination, a sun visor, is provided which includes a panel envelope formed of an elastic material defining a predetermined perimeter of a predetermined expanse having front and back surfaces, a single closed loop of a spring-like material located about an interior perimeter of the envelope, the loop dimensioned to have an expanse which is greater than the expanse of the envelope so as to stretch the envelope, and wherein a complaint compressive spring force of the loop retains the sun visor between a roof line adjacent to the interior of the windshield and the support arm while the vehicle is in motion.

Additional advantages of the present invention will be set forth in part in the description that follows and in part will be obvious from that description or can be learned from practice of the invention. The advantages of the invention can be realized and obtained by the apparatus particularly pointed out in the appended claims.

BRIEF DESCRIPTION OF THE SEVERAL VIEWS OF THE DRAWINGS

The accompanying drawings, which are incorporated in and which constitute a part of the specification, illustrate at least one embodiment of the invention and, together with the description, explain the principles of the invention.

DETAILED DESCRIPTION OF THE DRAWINGS

Unless specifically defined otherwise, all technical or scientific terms used herein have the same meaning as commonly understood by one of ordinary skill in the art to which this invention belongs.

Although any methods and materials similar or equivalent to those described herein can be used in the practice or testing of the present invention, the preferred methods and materials are now described. Reference will now be made in details to the presently preferred embodiments of the invention, examples of which are illustrated in the accompanying drawings wherein like numerals represent like features of the invention.

The invention is a novel auxiliary sun visor for a vehicle having a pair of sun visors and a rearview mirror disposed between the sun visors. The sun visor fits between the roofline of the vehicle and the mirror support arm on the windshield. The sun visor is a fabric covered spring wire, or plastic rod, formed to be larger than the space it will occupy while in service. In use, it is compressed into the space in front of the mirror, and the tendency of the spring wire to force outwardly causes a compliant compressive force to hold the sun visor in place. The visor may also include a reflective surface for reflecting light away from the interior of the vehicle.

Figure 1:
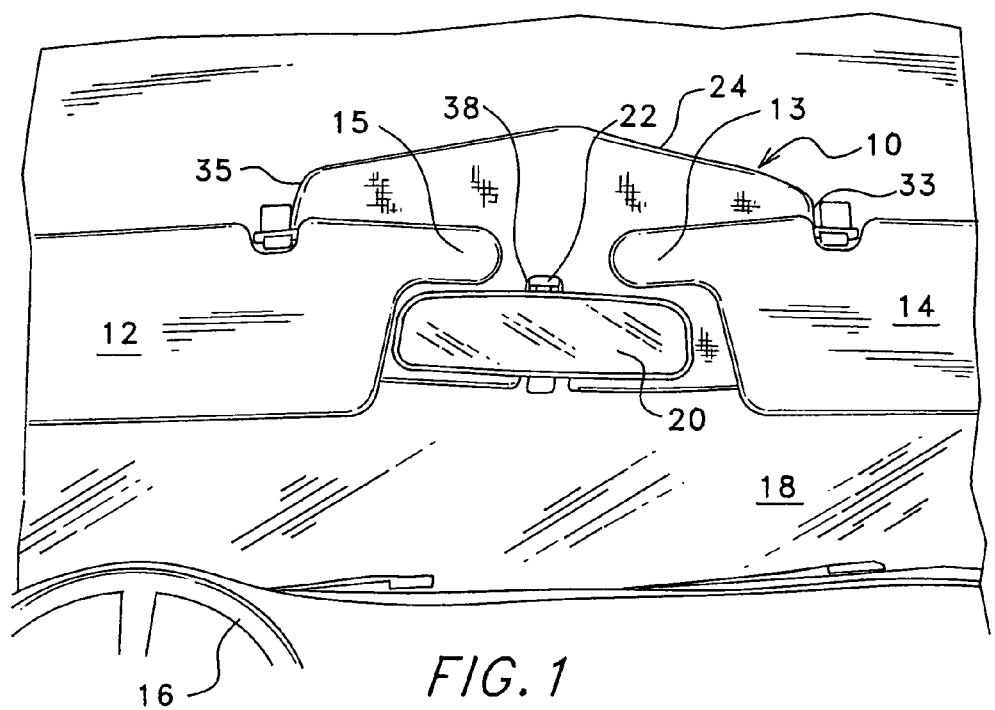
FIG. 1 is a fragmentary elevation view of the interior of a motor vehicle showing the auxiliary sun visor mounted in its operative position between the conventional visors and straddling the mounting post of the rear view mirror.

FIG. 1 shows a portion of the interior of a motor vehicle. Conventional visors 12 and 14 are pivotally mounted above the steering wheel 16 and above the seat adjacent to the driver. As illustrated in the drawing figure, when these visors 12 and 14 are moved downwardly to their operative position, they cover the upper portions of the windshield 18. The windshield 18 of the vehicle cooperates with the rear view mirror 20 assembly so that the auxiliary visor 10 may be compressed in front of the mirror 20 between the mirror support arm 22 and the roofline 24 of the vehicle for blocking the sun's rays. The typical mirror 20 assembly for most motor vehicles has the support arm 22 extending away from the windshield 18 for supporting the rear view mirror 20.

Figure 2:
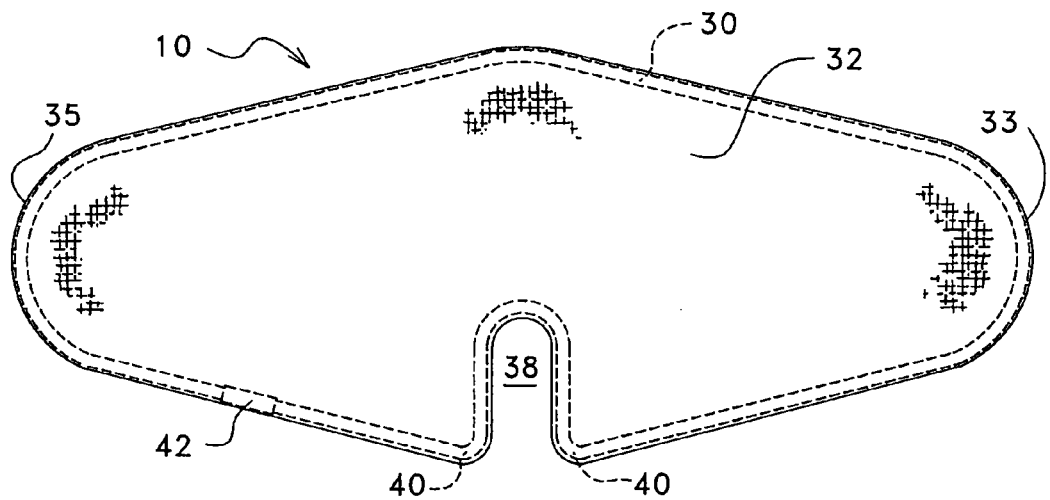
FIG. 2 is a sectional view of a preferred embodiment of the present invention showing one wall of the panel envelope and location of the spring wire used for stretching the envelope to form the panel.
Figures 3, 4:
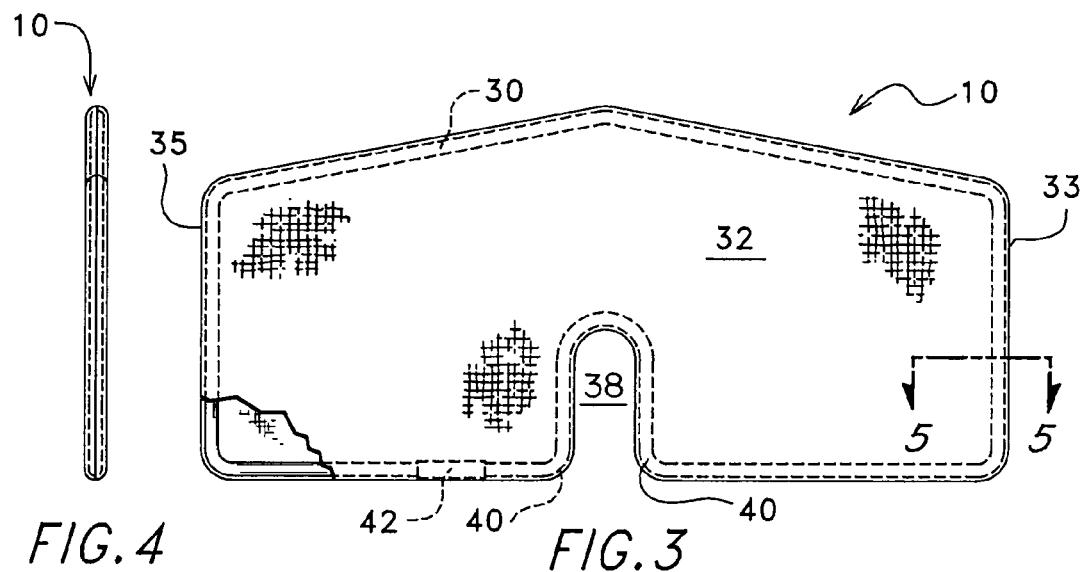
FIG. 3 is a sectional view of another embodiment of the invention showing one wall of the fabric envelope and the location of the spring wire for stretching the envelope, together with a slot for receiving the mirror support post.
FIG. 4 is a side view of the auxiliary visor shown in FIG. 3.
Figure 5:
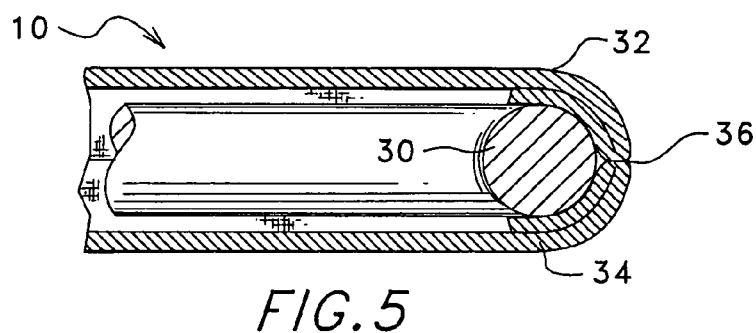
FIG. 5 is a sectional view along section 5 of FIG. 3.
Figure 6:
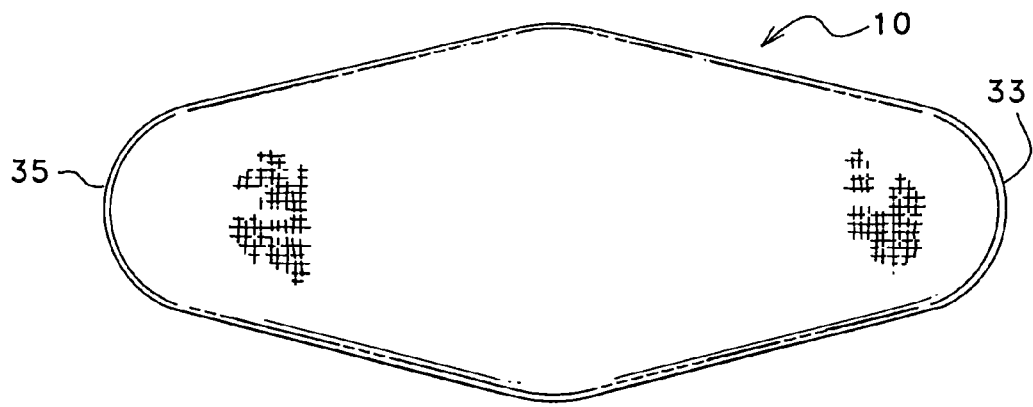
FIG. 6 is a perspective view of a third embodiment of the present invention.

Referring now to FIGS. 2, 3, and 5, the sun visor 10 is made of an envelope of a flexible elastic material, such as nylon. In its preferred form, the envelope is of an elongated generally elliptical shape having an inner spring wire 30 sandwiched between the outer layers 32, 34 that form the envelope. The outer cover layers 32, 34 are joined 36 along opposed peripheral edges to form a unitary panel envelope. One suitable procedure for joining 36 the outer layers 32, 34 along their outer peripheral edges is by sewing a hem in the outer cover layers 32, 34 or heat sealing the layers 32, 34 together. A slot 38, may but need not, extend from a lower central periphery 40 of the visor 10. The slot 38 itself is sized and proportioned to be of a width so as to permit easy clearance of the support arm 22, or post, supporting the rear view mirror 20, when the visor 10 is compressed into position in front of the rear view mirror 20, as shown in FIG. 1. It will be apparent to one skilled in the art that the width of the slot 38 may be varied according to different widths and sizes of mirror support arms 22 for mounting of the rear view mirror 20, and, as shown in FIG. 6, the slot 38 may be dispensed with entirely when used with mirror assemblies in which support arms 22 would not interfere with coverage of the visor 10 in bridging the gap between existing visors 12, 14.

FIGS. 3 and 4 illustrate a second embodiment of the present invention wherein the visor 10 panel perimeter is generally of a rectangular shape, with or without the slot 38, as described above. The spring wire 30 is preferably a single wire formed into a loop by fastening its ends together with a bushing 42 or a weld. FIG. 4 is a side view of the visor 10, shown in FIG. 3, and illustrates the lightweight and narrow construction of the visor 10 for ease in installation, removal, and storage. The width is preferably approximately 0.32 cm, but it may vary according to the availability of existing materials and manufacturing constraints. This narrow construction further allows the visor 10, while in use, to fit adjacent to the windshield 18 so as not to interfere with the normal space between the front of the mirror 20 and the windshield 18. Moreover, in combination with the compliant compressive force of the visor 10 which holds it in place between the roofline 24 and the mirror support arm 22, this narrow configuration allows for a selective movement of the visor 10 to different positions in front of the mirror 20.

Turning now to FIG. 5, outer coverings 32, 34 forming the visor 10 panel envelope are preferably joined at 36 with a hem along their peripheral edges created by sewing or heating. In this manner, outer coverings 32, 34 of the envelope provide a double wall of fabric protection along the periphery of the envelope where the spring wire 30 biases against the outer coverings 32, and 34. This construction improves the durability of the visor 10 in resisting the spring wire 30 from abrading through the envelope during use.

In order to secure the panel defining the visor 10 in front of the mirror 20, near the interior surface of the windshield 18, the spring wire 30 is quickly and easily compressed at any point along its periphery, inserted over the arm 22, or post, of the rear view mirror 20 and under the roof line 24 of the windshield 18 where the compliant compressive force of the spring wire 30 retains the sun visor 10 between the roofline 24 and the support arm 22 while the vehicle is in motion. In this manner, the visor 10 is easily and selectively adjusted in any position to effectively bridge the entire gap, or a portion thereof, between the existing visors 12, and 14 of many vehicle types. Preferably, the visor 10 is dimensioned so that the ends 33, 35 extend slightly beyond the ends 13, 15 of the existing visors 12 and 14, as illustrated in FIG. 1.

While the present invention has been described in connection with the illustrated embodiments, it will be appreciated and understood that modifications may be made without departing, from the true spirit and scope of the invention.

I claim:

1. In a motor vehicle wherein a rear view mirror is attached in a spaced relationship to an interior of a windshield by a support arm disposed intermediately between a pair of spaced sun visors, in combination, a sun visor, comprising:
   (a) a panel envelope formed of an elastic material defining a predetermined perimeter of a predetermined expanse having front and back surfaces;
   (b) a single closed loop of a spring-like material located about an interior perimeter of the envelope, the loop dimensioned to have an expanse which is greater than the expanse of the envelope so as to stretch the envelope;

(c) wherein a compliant compressive spring force of the loop retains the sun visor between a roofline adjacent to the interior of the windshield and the support arm while the vehicle is in motion; and (d) wherein the perimeter is generally ellipsoid and the perimeter includes a slot for receiving the support arm.

2. In a motor vehicle wherein a rear view mirror is attached in a spaced relationship to an interior of a windshield by a support arm disposed intermediately between a pair of spaced sun visors, in combination, a sun visor, comprising:

a panel envelope formed of an elastic material defining a predetermined perimeter of a predetermined expanse having front and back surfaces;

(b) a single closed loop of a spring-like material located about an interior perimeter of the envelope, the loop dimensioned to have an expanse which is greater than the expanse of the envelope so as to stretch the envelope;

(c) wherein a compliant compressive spring force of the loop retains the sun visor between a roofline adjacent to the interior of the windshield and the support arm while the vehicle is in motion; and (d) wherein the perimeter is generally rectangular and the perimeter includes a slot for receiving the support arm.

3. A method for screening a sun glare falling between a rear view mirror and a roof line of a motor vehicle, comprising:

(a) providing a panel envelope formed of an elastic material defining a predetermined perimeter of a predetermined expanse having front and back surfaces;

(b) providing a closed loop of a spring-like material located about an interior perimeter of the envelope, the loop dimensioned to have an expanse which is greater than the expanse of the envelope so as to stretch the envelope; and (c) providing a compliant compressive spring force of the loop to retain the panel envelope between the roofline and a support arm for the rear view mirror while the vehicle is in motion.

4. The method according to claim 3 wherein the envelope has a least one of the surfaces suitable for a reflecting of light.

5. The method according to claim 3 wherein the perimeter is generally ellipsoid.

6. The method according to claim 3 wherein the perimeter is generally rectangular.

7. The method according to claim 3 wherein the spring-like material is a metal spring wire.

* * * * *